United States Patent
Cadiz et al.

(10) Patent No.: US 7,616,750 B2
(45) Date of Patent: Nov. 10, 2009

(54) METHOD AND SYSTEM FOR FORWARDING TELEPHONE CALLS BASED ON PRESENCE INFORMATION

(75) Inventors: Jonathan J. Cadiz, Redmond, WA (US); Amritansh Raghav, Seattle, WA (US); Sira P. Rao, Redmond, WA (US); Venkateshaiah Setty, Bellevue, WA (US); Eran Shtiegman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 834 days.

(21) Appl. No.: 11/067,611

(22) Filed: Feb. 25, 2005

(65) Prior Publication Data

US 2006/0193460 A1 Aug. 31, 2006

(51) Int. Cl.
*H04M 3/42* (2006.01)
(52) U.S. Cl. ............... 379/211.02; 379/212.01; 379/207.12
(58) Field of Classification Search ............ 379/211.02, 379/212.01, 207.12
See application file for complete search history.

(56) References Cited

U.S. PATENT DOCUMENTS

| | | |
|---|---|---|
| 5,987,106 A | 11/1999 | Kitamura et al. |
| 6,018,571 A | 1/2000 | Langlois et al. |
| 6,404,874 B1 | 6/2002 | Chestnut |
| 6,445,694 B1 | 9/2002 | Swartz |
| 6,628,647 B1 | 9/2003 | Chua et al. |
| 6,728,543 B2 | 4/2004 | Immonen et al. |
| 6,754,313 B1 | 6/2004 | Quinton et al. |
| 6,757,704 B1 | 6/2004 | Denker et al. |
| 6,785,234 B1 | 8/2004 | Pruski |
| 6,853,634 B1 * | 2/2005 | Davies et al. ............... 370/349 |
| 7,203,294 B2 * | 4/2007 | Carnazza et al. ....... 379/142.07 |
| 2001/0043191 A1 | 11/2001 | Lindsey |
| 2002/0018550 A1 | 2/2002 | Hafez |
| 2002/0034290 A1 | 3/2002 | Pershan |
| 2003/0003900 A1 | 1/2003 | Goss et al. |

(Continued)

FOREIGN PATENT DOCUMENTS

GB 2 361 821 2/2000

(Continued)

OTHER PUBLICATIONS

Silver, Andrew et al., "Unified Network Presence Management," May 21, 2000.

(Continued)

*Primary Examiner*—Simon Sing
(74) *Attorney, Agent, or Firm*—Perkins Coie LLP

(57) ABSTRACT

A call forwarding system forwards telephone calls based on presence information of a user as reported by computing devices associated with a telephone number. When a telephone system receives an incoming call directed to one of the telephone numbers of the user's computing devices, it sends an incoming call event to each computing device. Upon receiving the incoming call event from a telephone system, each computing device determines whether the user is most likely present at that computing device based on the presence information. When a computing device determines that the user is most likely present at that computing device, it sends a notification to the telephone system to forward the incoming call to the telephone number associated with that computing device to effect the automatic forwarding of a call based on presence information.

18 Claims, 12 Drawing Sheets

U.S. PATENT DOCUMENTS

| | | | |
|---|---|---|---|
| 2004/0133627 A1* | 7/2004 | Kalyanaraman et al. | .... 709/201 |
| 2004/0202304 A1 | 10/2004 | Weaver | |
| 2005/0020238 A1 | 1/2005 | Eastman et al. | |
| 2005/0152527 A1* | 7/2005 | Kent et al. | ............. 379/211.02 |

FOREIGN PATENT DOCUMENTS

| | | |
|---|---|---|
| WO | WO98/21911 | 5/1998 |
| WO | WO02/27985 | 4/2002 |
| WO | WO2004/049686 | 6/2004 |

OTHER PUBLICATIONS

European Search Report for European Patent Application No. 06 10 0508, Microsoft Corporation, Mar. 10, 2006.

IQ NetSolutions, "Value Presence & Call Control," Copyright 2005 IQ NetSolutions, Inc., Accessed May 10, 2006 (3 pages) http://www.iqnetsolutions.com/primary.aspx?id=54.

Innovaphone, Copyright 1997-2007 Innovaphone AG (2 pages) http://www.innovaphone.de/webneu2/products/en_sphone.asp, [last accessed Feb. 5, 2007].

* cited by examiner

METHOD AND SYSTEM FOR FORWARDING TELEPHONE CALLS BASED ON PRESENCE INFORMATION

CROSS REFERENCE

This application is related to U.S. patent application Ser. No. 11/066,716 entitled "METHOD AND SYSTEM FOR MUTING AUDIO BASED ON A CALL EVENT" and filed concurrently, which is hereby incorporated by reference.

TECHNICAL FIELD

The described technology relates generally to computer systems for forwarding telephone calls.

BACKGROUND

Real-time conversations between conversation participants via their computer systems are becoming increasingly common. Such real-time conversation requires that the participants be present at their computer systems (e.g., personal digital assistants) and able to respond when a communication is received. A common form of real-time conversation is provided by instant messaging services. An instant messaging service allows participants to send messages and have them received within a second or two by the other participants in the conversation. The receiving participants can then send responsive messages to the other participants in a similar manner. To be effective, a real-time conversation relies on the participants' becoming aware of, reviewing, and responding to received messages very quickly. This quick response is in contrast to conventional electronic mail systems in which the recipients of electronic mail messages respond to messages at their convenience.

When an initiating participant wants to start a real-time conversation, that participant needs to know whether the intended participants are available to respond in real time to a message. If not, then communications via conventional electronic mail, voice mail, or some other mechanism may be more appropriate. For example, if the computers of the intended participants are currently powered off, then a real-time conversation may not be possible. Moreover, if their computers are currently powered on, but the intended participants are away from their computers, a real-time conversation is also not possible. The initiating participant would like to know the availability of the intended participants so that an appropriate decision on the form of communication can be made.

The availability status of an entity such as a computer system or a user associated with that computer system is referred to as "presence information." Presence information identifies the current "presence state" of the user. Users make their presence information available so that other users can decide how best to communicate with them. For example, the presence information may indicate whether a user is logged on ("online") with an instant messaging service or is logged off ("offline"). Presence information may also provide more detailed information about the availability of the user. For example, even though a user is online, that user may be away from their computer in a meeting. In such a case, the presence state may indicate "online" and "in a meeting."

In an instant messaging context, a publishing user ("publisher") may provide their presence information to a presence server that then provides the presence information to subscribing users ("subscribers"). Thus, a presence server may use a subscriber/publisher model to provide the presence information for the users of the presence service. Whenever the presence information of a user changes, the presence server is notified of the change by that user's computer system and in turn notifies the subscribing users of the change. A subscribing user can then decide whether to initiate an instant messaging conversation based on the presence information of the intended participants. For example, if the presence information indicates that a publishing user is currently in a conference telephone call, then the subscribing user may decide to send an instant message, rather than place a telephone call, to the publishing user. If the subscribing user, however, needs to call and speak with the publishing user, the subscribing user needs to monitor the presence information of the publishing user to know when the call can be placed. When the subscribing user notices that the publishing user's presence information indicates that the telephone conference has been concluded, the subscribing user can then place the telephone call.

Although presence information is available to subscribing computer systems so that decisions can be made about the appropriate form of communication, presence information is not available to devices that cannot or do not subscribe to presence information. For example, when a person wants to place a telephone call, the person may not know the current location of the person to be called because the person is not near a computer system or the person to be called will not allow the calling person to subscribe to their presence information. As a result, the calling person may try calling several different telephone numbers before locating the called person. Although some systems attempt to address the problem of having to call multiple telephone numbers, those systems have various disadvantages. For example, one system allows a person to have a primary telephone number and to forward calls received on the primary telephone number to other secondary telephone numbers. A disadvantage of such a system is that the person needs to manually forward the calls and needs to remember to forward the calls as the person moves from place to place. Another system allows a person to have a primary telephone number and other secondary telephone numbers. When a call is received on the primary telephone number, the system may sequentially call each secondary telephone number until a call is answered or may simultaneously call the secondary telephone numbers. When a user answers one of the simultaneously placed calls, then the system drops the other calls. A disadvantage of the sequential approach is that it may take a while to sequentially call each secondary telephone number and the calling person needs to wait. A disadvantage of the simultaneous approach is that extra telephone lines are needed to place the simultaneous calls.

Computer systems (and other devices) are increasingly being used to render audio. When a telephone call is received at a telephone near the computer system that is rendering audio, it may be difficult (especially when on a speaker phone) for the user to conduct the telephone conversation because of the volume of the audio. A user typically will try to mute the audio before the call is answered. It may, however, be difficult for the user to find the appropriate user interface for muting the audio. Indeed, the calling person may hang up or be directed to voice mail before the called person can mute the audio and answer the call.

It would be desirable to have a mechanism that would allow a telephone call to be automatically forwarded to a telephone where the called person is currently located. Also, it would be desirable to have a mechanism that would help solve the problem of audio being rendered during a telephone call.

SUMMARY

A method and system for automatically forwarding a telephone call to a telephone number based on presence information of a computing device associated with the telephone number is provided. A call forwarding system forwards telephone calls based on presence information of a user as reported by computing devices associated with telephone numbers. Each computing device may maintain a list of mappings from the user's computing devices to their associated telephone numbers. When a telephone system receives an incoming call directed to one of the telephone numbers of a user's computing device, it sends an incoming call event to each computing device. Upon receiving the incoming call event, each computing device determines whether the user is most likely present at that computing device based on the presence information. When a computing device determines that the user is most likely present at that computing device, it sends a notification to the telephone system to forward the incoming call to the telephone number associated with that computing device to effect the automatic forwarding of a call based on presence information.

DETAILED DESCRIPTION

Figure 1:
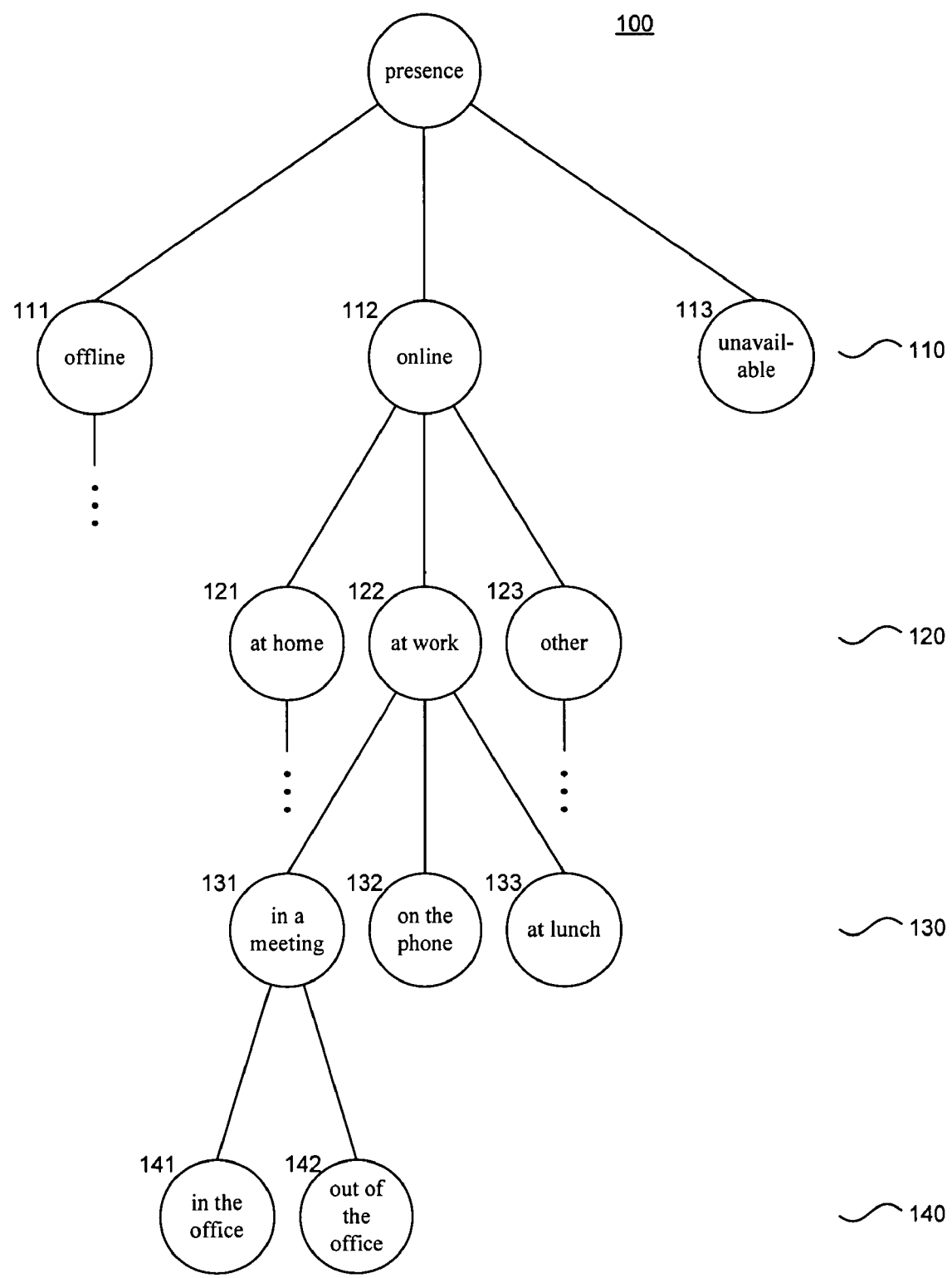
FIG. 1 is a diagram illustrating a presence model of presence states in one embodiment.

A method and system for automatically forwarding a telephone call to a telephone number based on presence information of a computing device associated with the telephone number is provided. In one embodiment, a call forwarding system forwards telephone calls based on presence information of a user as reported by computing devices associated with telephone numbers. For example, a user may have multiple computing devices such as a workplace desktop, a workplace laptop, a home desktop, a personal digital assistant, and so on. Each computing device may have an associated telephone number (e.g., for a telephone in the office where a desktop is located). The call forwarding system of each computing device subscribes to receive the presence information of each other computing device of the user. The call forwarding system of each computing device also subscribes to receive telephone information (e.g., an incoming call event) from a telephone system for all the telephone numbers associated with the user's computing devices. Each computing device may maintain a list of mappings from the user's computing devices to their associated telephone numbers for subscribing to presence information and telephone information. For example, an office desktop computer of the user may have the telephone number of the telephone in the office or the telephone number of a voice over IP computer-based connection associated with it, and a laptop computer may have the telephone number of a cell phone associated with it. When the telephone system receives an incoming call directed to one of the telephone numbers of the user's computing device, it sends an incoming call event to each computing device. Upon receiving the incoming call event, each computing device determines whether the user is most likely present at that computing device based on the presence information. For example, if it has been 30 seconds since the user last interacted with a computing device and more than two hours since the user last interacted with any of the other computing devices, then the user was most recently active at the computing device with activity 30 seconds ago. When a computing device determines that the user is most likely present at that computing device, it sends a notification to the telephone system to forward the incoming call to the telephone number associated with that computing device. Since each computing device employs the same algorithm and the same presence information for determining whether the user has been most recently active at that computing device, only one computing device will decide to send a call forwarding notification to the telephone system. In this way, a calling person can place a call to any one of the telephone numbers associated with the called person and have the telephone call automatically forwarded to the telephone number associated with the computing device at which the user is most likely present.

In one embodiment, the call forwarding system of the computing device at which the user is most likely present also sends an electronic mail notification to the user indicating that the call has been forwarded. The electronic mail notification may include the name of the calling person, calling telephone number, time of call, called telephone number, forwarded telephone number, and so on. If the telephone call (after being forwarded or not) is not answered, then the computing device that requested the call to be forwarded may send an appropriate electronic mail notification to the user. Alternatively, if all the computing devices receive a call not answered event, then a "distinguished" computing device may send the electronic mail notification to the user. A distinguished computing device is the one that can uniquely identify itself based on certain characteristics relative to the other computing devices. For example, the distinguished computing device may have the lowest network address of all the computing devices or may have the most recent user activity. The network addresses may be published with or be derived from the presence information. The call forwarding system may use methods of communication other than electronic mail notifications to notify users. For example, the call forwarding system could provide the notification by sending a text message to a mobile device (e.g., cell phone or pager), sending an instant message, or placing a call to the user on a specified phone number (e.g., a cell phone).

In one embodiment, if the user is not present at any of the computing devices, a distinguished computing device may forward the call to a default telephone number. For example, if each computing device determines that the most recent user activity at any computing device was more than an hour ago, then each computing device may determine that the user is not present at that computing device. The distinguished computing device then requests the telephone system to forward the incoming telephone call to a default telephone number. For example, the default telephone number may be for a cellular phone and/or may provide voice mail services, paging services, and so on. The distinguished computing device may also send an electronic mail message to the user indicating that the call was forwarded to the default telephone number.

The call forwarding system may allow a user to define one or more telephone numbers to be associated with each computing device. The call forwarding system may also rely on automatic association of a telephone number with a computing device. For example, a user may use the laptop that is connected to a wireless LAN via different access points. The call forwarding system may determine the access point through which the laptop is currently accessing the network and automatically associate the laptop with the telephone number of a telephone near that access point. As another example, if the laptop is GPS enabled, then the call forwarding system may use global positioning information to locate a nearby telephone. If the laptop is cell phone enabled, then the call forwarding system may use cell triangulation to locate a nearby telephone.

In one embodiment, the call forwarding system may include a muting system that allows audio of a computing device to be automatically muted when a telephone call is received on a telephone number associated with the computing device. The muting system of a computing device subscribes to receive telephone information for the associated telephone number from the telephone system. When a call event occurs for that telephone number, the telephone system notifies the computing device. If the event is an incoming call, then the computing device may direct the operating system to mute the audio of the computing device. Alternatively, the muting system may direct certain software components (e.g., applications) to mute their audio or to pause. For example, if the software component is playing a movie from a DVD, then the muting system may request the software component to pause the movie. If the software component is receiving a data stream, then it may buffer the data stream while it is paused. When the muting system subsequently receives a hang up event indicating that the call has terminated, it may automatically un-mute or resume the software components. The muting system may allow a user to manually specify to un-mute or resume the software components. In this way, the audio can be automatically muted when a call event occurs.

In one embodiment, the muting system may provide a user interface through which a user can provide configuration information specifying the actions to be taken for the various call events. For example, the user may specify that the audio should be muted when an outgoing call event occurs, but that the software component playing a movie from a DVD should not be paused. Alternatively, the user may specify that the audio should only be muted when an incoming call is answered or an outgoing call is placed using the speakerphone option of the telephone. (The telephone would need to notify the telephone system so that it can notify the computing device.) As another example, the user may specify that the audio should be un-muted when the user selects the mute button of the telephone. The muting system may allow the user to specify on an application-by-application basis to mute or pause the application based on the various call events. The muting system may allow the user to specify that all audio of the computing device should be muted. In that case, the muting system may direct the operating system to mute the audio. The muting system may also allow the muting of audio based on video conferencing events and PSTN conferencing events.

FIG. 1 is a diagram illustrating a presence model of presence states in one embodiment. The presence model 100 defines a hierarchy of presence states of a publishing entity, such as a user, client, or computer system. The first-level presence states 110 are "offline" 111, "online" 112, and "unavailable" 113. "Offline" indicates that the publishing entity is not currently available, "online" indicates that the publishing entity is currently logged on to the presence server, and "unavailable" indicates that no presence information is currently available. The second-level presence states 120 of the "online" presence state are "at home" 121, "at work" 122, and "other" 123. "At home" indicates that the publishing entity is online at home, "at work" indicates that the publishing entity is online at work, and "other" indicates that the publishing entity is online at some other location. The third-level presence states 130 of the "at work" presence state are "in a meeting" 131, "on the phone" 132, and "at lunch" 133, which are self-descriptive. The fourth-level presence states 140 of the "in a meeting" presence state are "in the office" 141 and "out of the office" 142, which are also self-descriptive. A user may be allowed to define the hierarchy of presence states of a presence model and to define multiple presence models. The call forwarding system may allow contacts to define in which presence states they are available to communicate and the method or methods of communication that are allowed or desirable in each presence state. The call forwarding system may also allow a user to select for which presence states of contacts the user wants to be notified.

Figure 2:
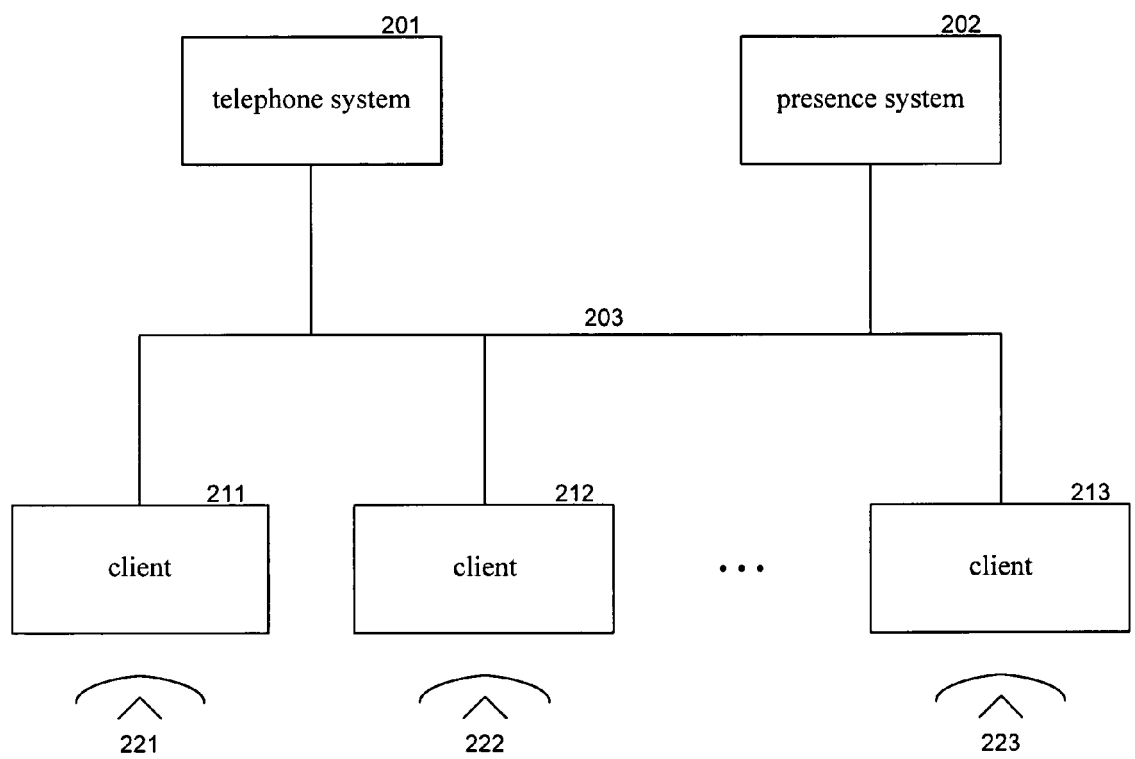
FIG. 2 is a block diagram that illustrates systems used by the call forwarding system in one embodiment.

FIG. 2 is a block diagram that illustrates systems used by the call forwarding system in one embodiment. The call forwarding system is implemented on each client computer system 211-213 and interacts with telephone system 201 and presence system 202 via communications link 203. Each client computer system may have one or more telephone numbers associated with it, such as for telephones 221-223. The telephone system may be a private branch exchange ("PBX") or some other telephone server (e.g., packet switching, voice over IP) that has a capability to notify the client computer systems when a call event occurs for one of the telephone numbers associated with the client computer systems. The telephone system may allow each client computer system to subscribe to receive the telephone information for various telephone numbers. The presence system allows each client computer system to subscribe to the presence information of each other client computer system. When the presence system receives updated presence information for a client computer system, it notifies the other client computer systems of the update to the presence information of that client computer system. When a client computer system receives an incoming call event from the telephone system, the client computer system determines whether the user was most recently active at that client computer system. If so, the client computer system then directs the telephone system to forward the call to the telephone number associated with that client computer system. For example, when the telephone system receives an incoming call directed to telephone 221, it sends an incoming call event to each client computer system. Each client computer system then determines based on presence information whether the user was most recently active at that client computer system. If client computer system 212 determines that the user was most recently active at that client computer system, then it directs the telephone system to forward the incoming call to telephone 222. Client computer systems 211 and 213 will determine that the user was not most recently active at those computer systems and will not request the telephone system to forward the incoming call.

Figure 3:
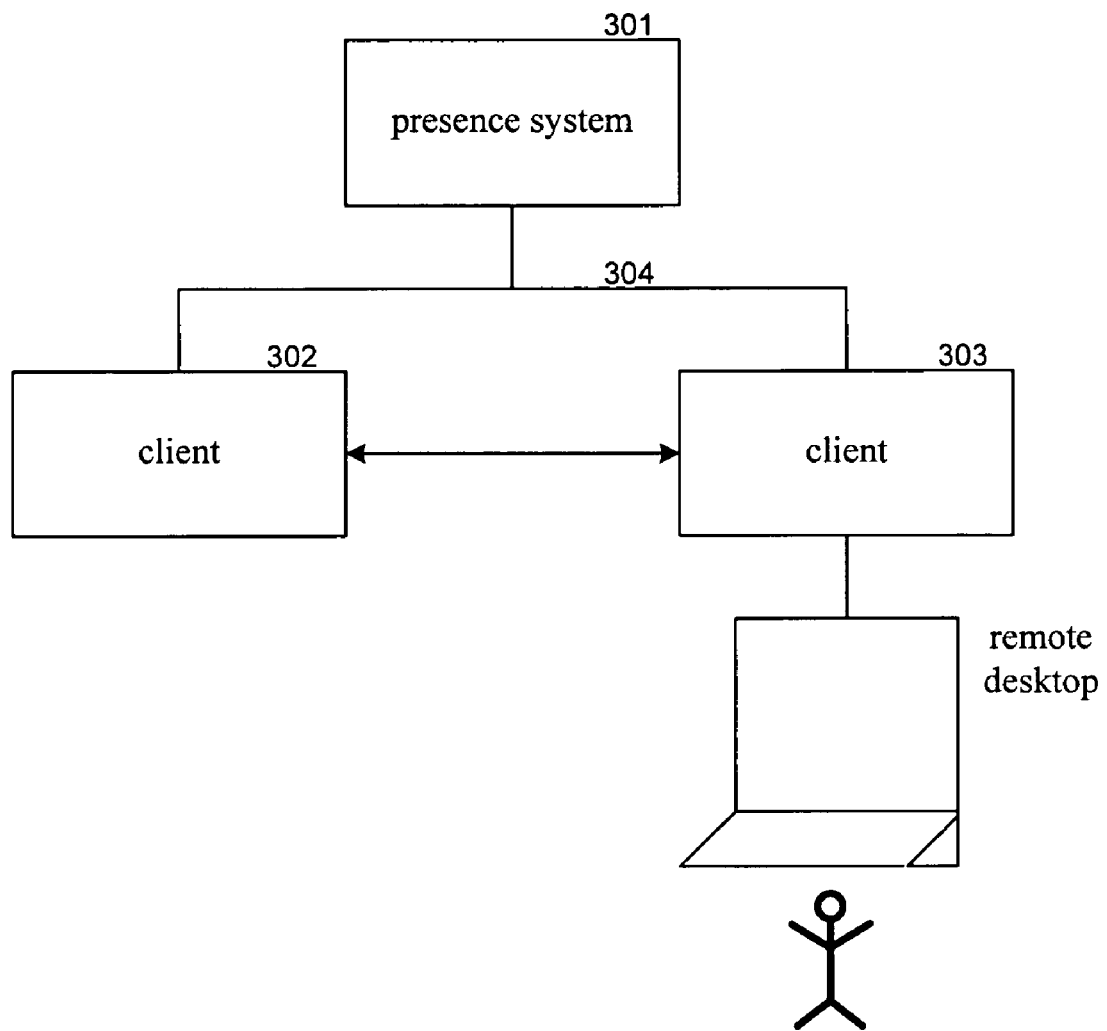
FIG. 3 is a block diagram illustrating remote access of a client computer system in one embodiment.

FIG. 3 is a block diagram illustrating remote access of a client computer system in one embodiment. Client computer systems 302-303 are connected to presence system 301 via communications link 304. The user at client computer system 303 is accessing client computer system 302 remotely. For example, client computer system 303 may be a laptop, and the user is running a certain application on client computer system 302 that is not available on the laptop. Both client computer systems 302-303 published their presence information to the presence system. A difficulty may occur if client computer system 302 detects the user has been most recently active at that computer system. In such a case, the call forwarding system executing on client computer system 302 would direct an incoming call to be forwarded to the telephone number associated with client computer system 302. However, the user may not be physically near client computer system 302. A timing diagram 305 illustrates the difficulty. A user at client computer system 303 may interact with client computer system 303 at time 1:00:00. Client computer system 303 then publishes the activity to the presence system. Because the interaction relates to a remote access, client computer system 303 sends a notification request to client computer system 302. Client computer system 302 receives the request at time 1:00:01 and publishes the activity to the presence system. If an incoming call event is received at time 1:00:02, then client computer systems 302-303 will both determine that client computer system 302 was most recently active. To prevent this determination, each computer system publishes whether an activity is the result of remote access or not. When a client computer system identifies the client computer system whose activity has been most recent, it discards activities indicated as being via remote access. Thus, in the example above, both client computer systems 302-303 will discard the activity of client computer system 302 at time 1:00:01 and determine that the most recent activity was by client computer system 303 at time 1:00:00.

Figure 4:
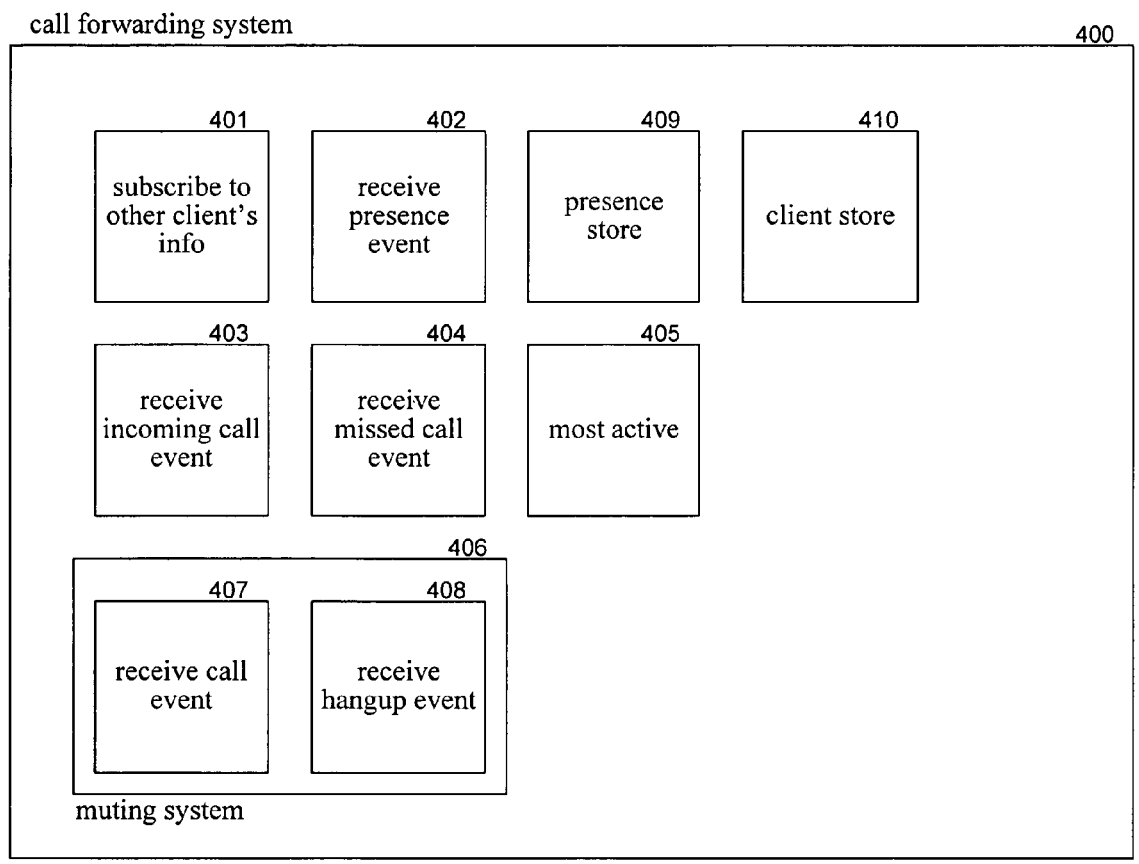
FIG. 4 is a block diagram that illustrates components of the call forwarding system in one embodiment.

FIG. 4 is a block diagram that illustrates components of the call forwarding system in one embodiment. The call forwarding system 400 includes a subscribe to other client's information component 401, a receive presence event component 402, a receive incoming call event component 403, a receive missed call event component 404, a most active component 405, and a muting system 406. The muting system includes a receive call event component 407 and a receive hang up event component 408. The call forwarding system also includes a presence store 409 and a client store 410. The subscribe to other client's information component subscribes to receive the presence information and telephone information of the other client computer systems and their associated telephone numbers. The client store contains a list of the other client computer systems along with their associated telephone numbers. The receive presence event component receives event notifications from the presence system and stores the presence information in the presence store. The receive incoming call event component is invoked when an incoming call event is received, and it invokes the most active component to determine whether the client computer system is the most active. If it is, then it directs the telephone system to forward the incoming call to an associated telephone number. The received missed call event notification component is invoked when a call not answered event is received. The component determines whether the client computer system is the distinguished client computer system and, if so, sends an electronic mail notification to the user. The receive call event component of the muting system is invoked when a call event occurs and mutes or pauses based on a configuration information. The receive hang up event component is invoked when a call hang up event is received and un-mutes or resumes applications.

The computing device on which the call forwarding system is implemented may include a central processing unit, memory, input devices (e.g., keyboard and pointing devices), output devices (e.g., display devices), and storage devices (e.g., disk drives). The memory and storage devices are computer-readable media that may contain instructions that implement the call forwarding system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the call forwarding system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The call forwarding system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 5:
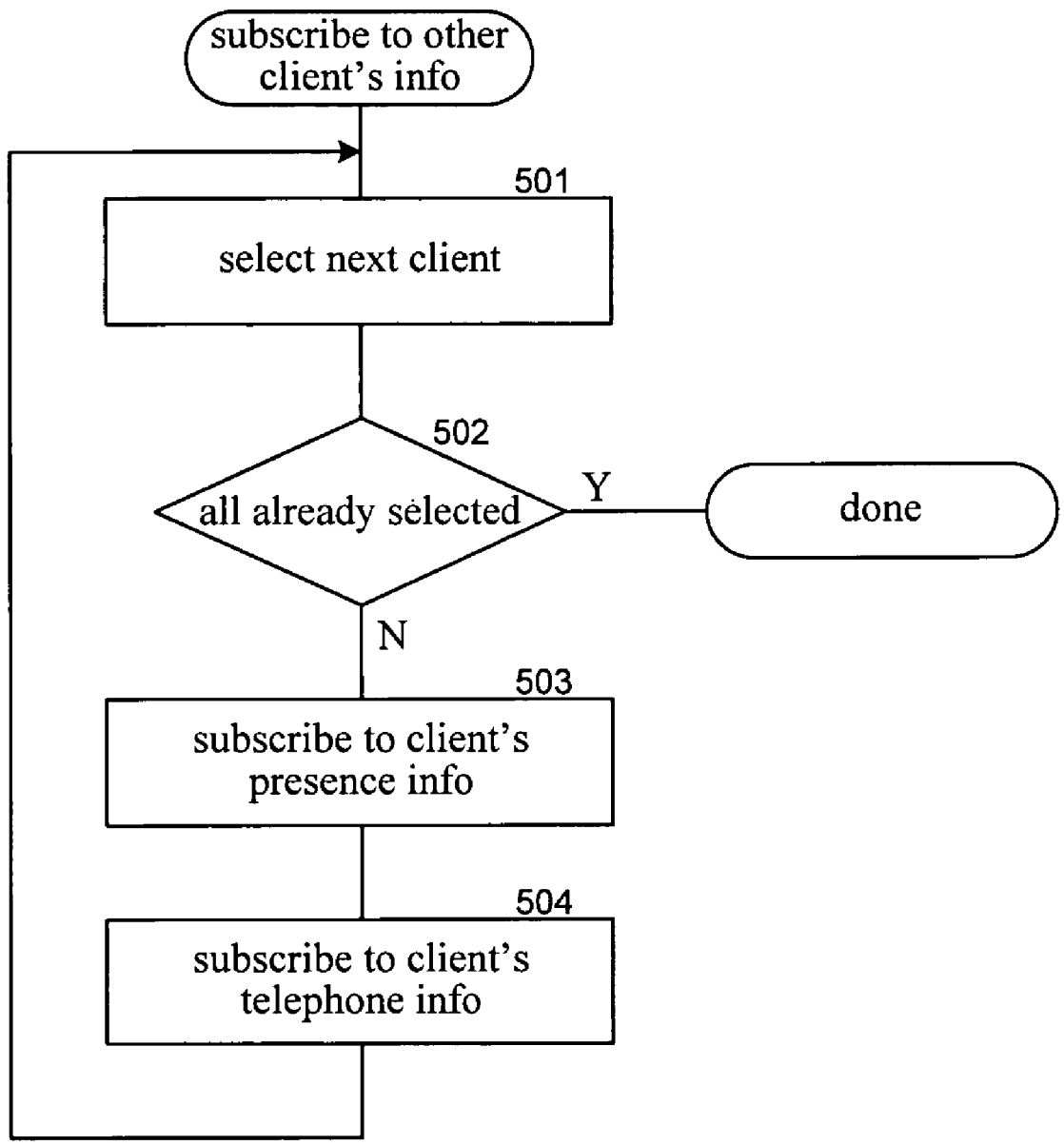
FIG. 5 is a flow diagram that illustrates the processing of the subscribe to other client's information component in one embodiment.

FIG. 5 is a flow diagram that illustrates the processing of the subscribe to other client's information component in one embodiment. The component subscribes to presence information and telephone information associated with the other client computer systems. In block 501, the component selects the next client computer system from the client store. In decision block 502, if all the client computer systems have already been selected, then the component completes, else the component continues at block 503. In block 503, the component subscribes to the presence information of the selected client computer system. In block 504, the component subscribes to the telephone information of the selected client computer system and then loops to block 501 to select the next client computer system.

Figure 6:
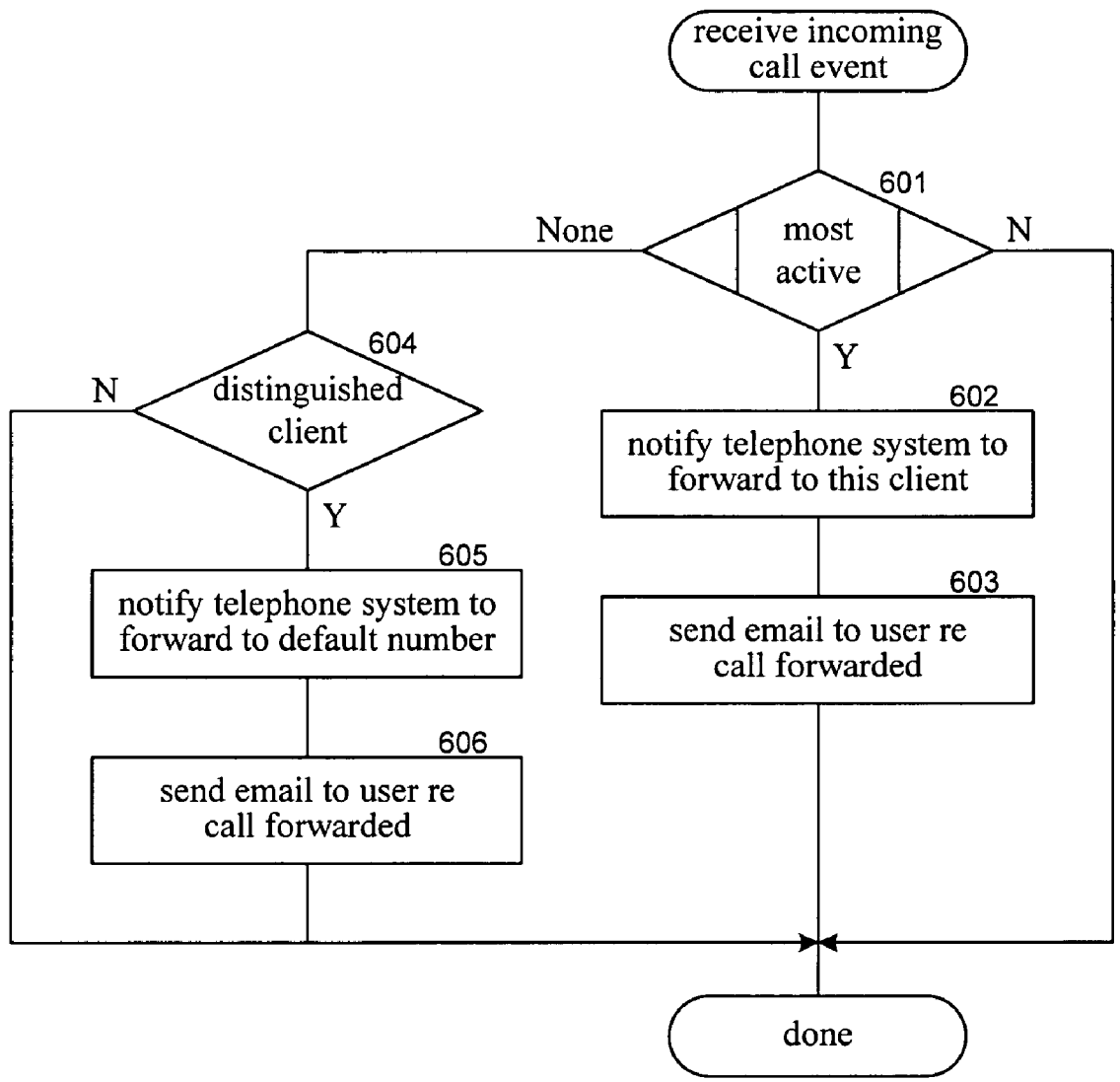
FIG. 6 is a flow diagram that illustrates the processing of the receive incoming call event component in one embodiment.

FIG. 6 is a flow diagram that illustrates the processing of the receive incoming call event component in one embodiment. The component is invoked when the client computer system receives an incoming call event from the telephone system. In decision block 601, the component invokes the most active component to determine whether the client computer system on which the component is executing is the most active. If the client computer system is the most active, then the component continues at block 602. If none of the client computer systems are currently active, then the component continues at block 604, else the component completes. In block 602, the component notifies the telephone system to forward the incoming call to the telephone number associated with the client computer system. In block 603, the component sends an electronic mail message to the user indicating that the call has been forwarded and the component completes. In decision block 604, if this client computer system is the distinguished client computer system, then the component continues at block 605, else the component completes. In block 605, the component notifies the telephone system to forward the incoming call to the default telephone number. In block 606, the component sends an electronic mail message to the user indicating that the incoming call has been forwarded to the default number. The component then completes.

Figure 7:
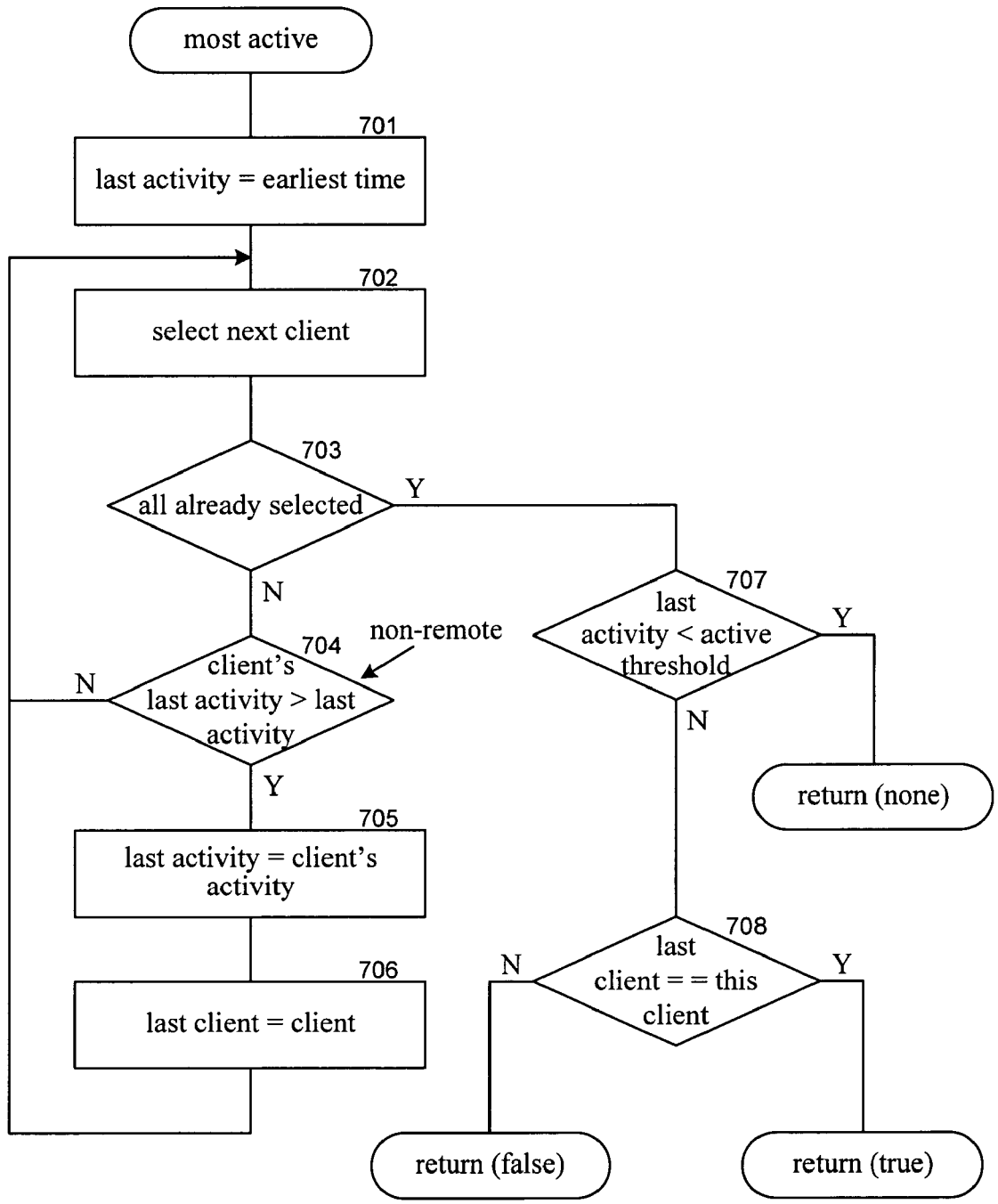
FIG. 7 is a flow diagram that illustrates the processing of the most active component in one embodiment.

FIG. 7 is a flow diagram that illustrates the processing of the most active component in one embodiment. The most active component determines whether the user is currently most active at the client computer system on which it is executing. The component returns an indication of true if it is, false if another client computer system is most active, and none if the user is not active at any client computer system. In block 701, the component initializes the last activity variable to the time of the earliest possible activity. In blocks 702-706, the component loops selecting each client computer system and determining whether its last activity is more recent than the last activity encountered so far. In block 702, the component selects the next client computer system. In decision block 703, if all the client computer systems have already been selected, then the component continues at block 707, else the component continues at block 704. In decision block 704, if the last activity (e.g., non-remote activity) of the selected client computer system is more recent than the last activity encountered so far, then the component continues at block 705, else the component loops to block 702 to select the next client computer system. In block 705, the component sets the last activity encountered so far to the last activity of the selected client computer system. In block 706, the component records that the selected client computer system has the most recent activity encountered so far. The component then loops to block 702 to select the next client computer system. In decision block 707, if the last activity of a client computer system is too long ago to consider the user to be active, then the component returns an indication that the user is not active at any client computer system, else the component continues at block 708. In decision block 708, if the client computer system that is executing has been identified as having the most recent user activity, then the component returns true, else the component returns false.

Figure 8:
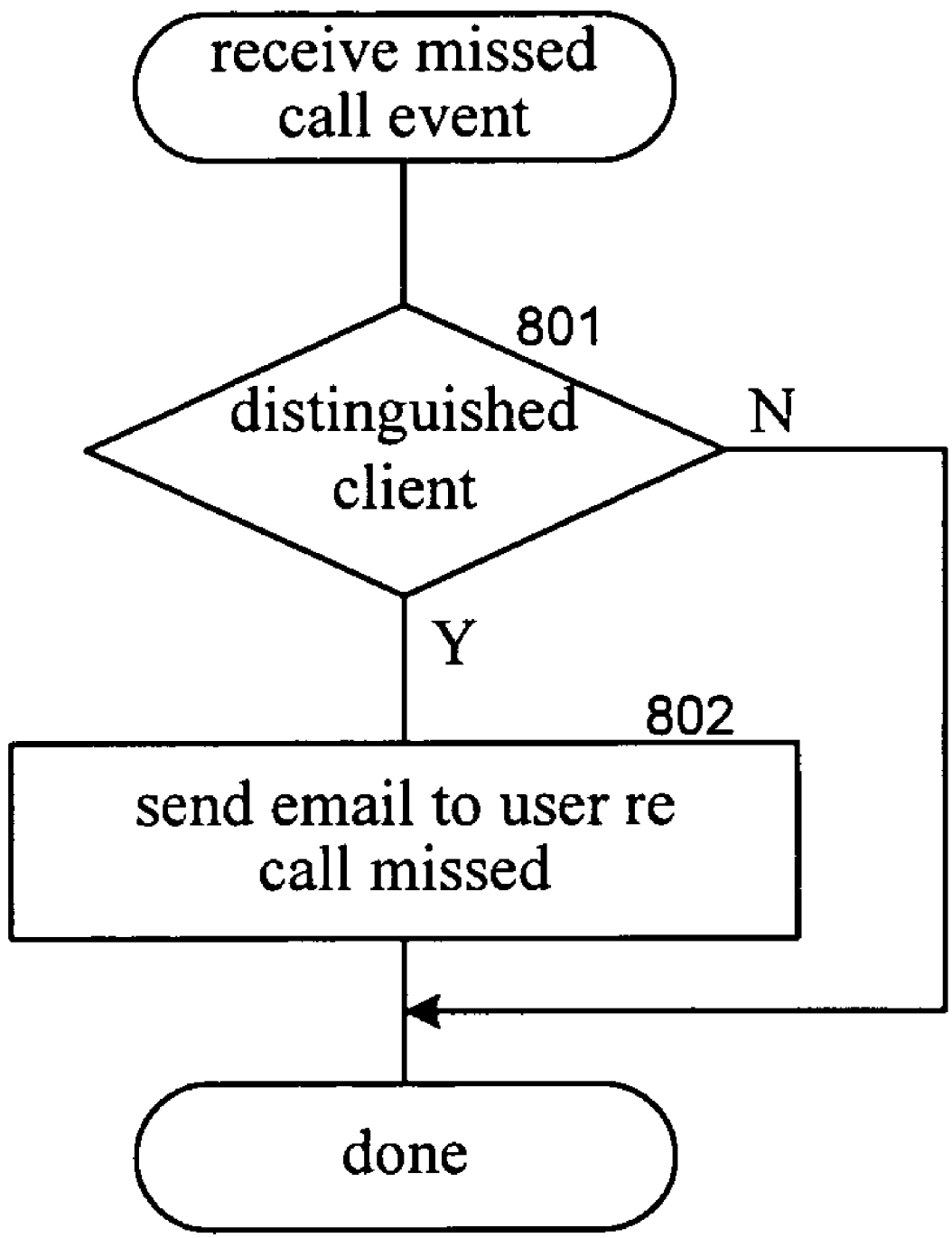
FIG. 8 is a flow diagram that illustrates the processing of the receive missed call event component in one embodiment.

FIG. 8 is a flow diagram that illustrates the processing of the receive missed call event component in one embodiment. The component is invoked when a client computer system receives from the telephone system a call not answered event. In decision block 801, if this client computer system is the distinguished client computer system, then the component sends an electronic mail message to the user indicating that the call was missed in block 802. The component then returns.

Figure 9:
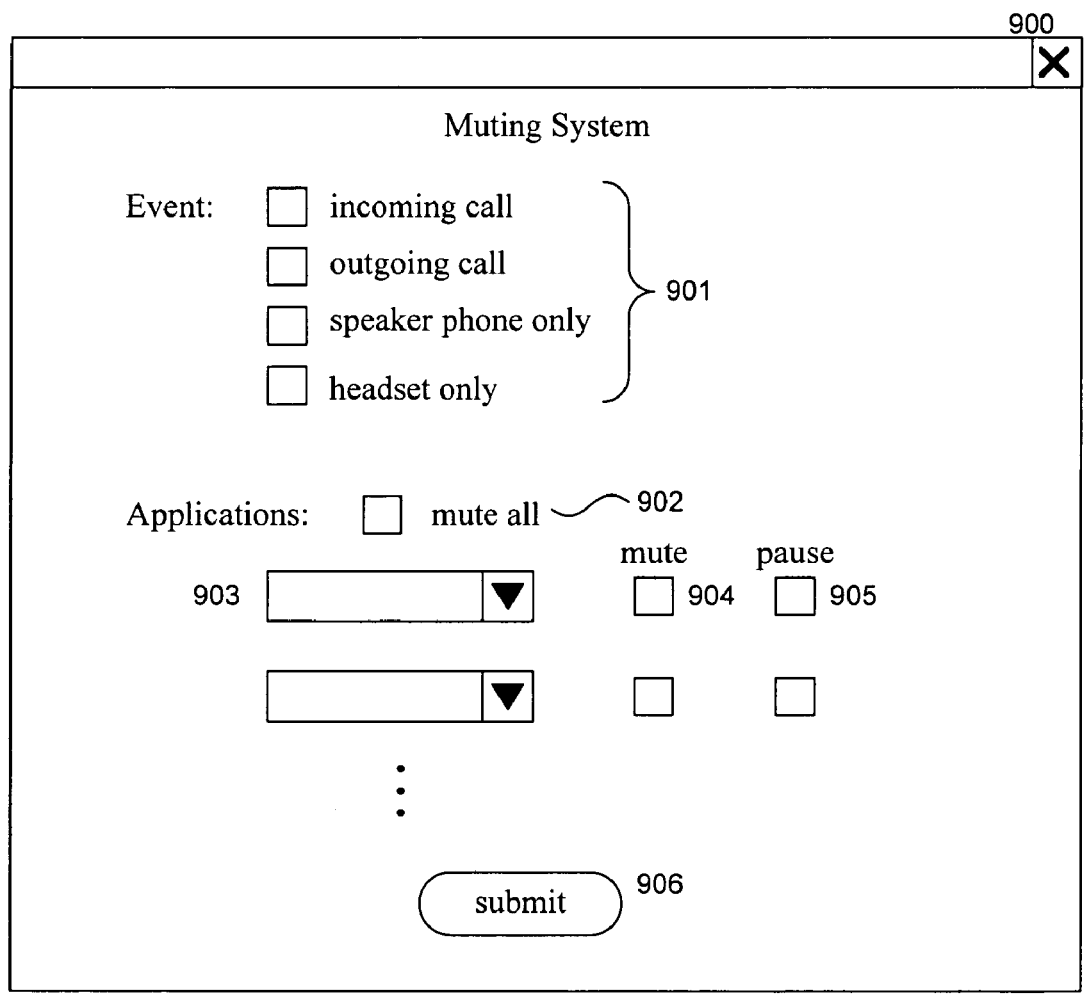
FIG. 9 is a display page illustrating the user interface of the muting system in one embodiment.

FIG. 9 is a display page illustrating the user interface of the muting system in one embodiment. The display page 900 includes an event selection area 901 and action selection area including a mute all checkbox 902, application selection drop-down lists 903, application mute checkboxes 904, and application pause checkboxes 905. A user may specify one or more telephone events in the event selection area and indicate the application and action in the action selection area. For example, the user may select the incoming call checkbox, select an application that renders a DVD from the drop-down list, and select the pause checkbox. After the user has specified the selection, the user may select the submit button 906 to submit the configuration. When an incoming call event is received by the client computer system, it will direct the application that renders a DVD to pause. One skilled in the art will appreciate that additional events (e.g., call answered) and actions (e.g., lower volume) may also be defined and that a different user interface may be used.

Figure 10:
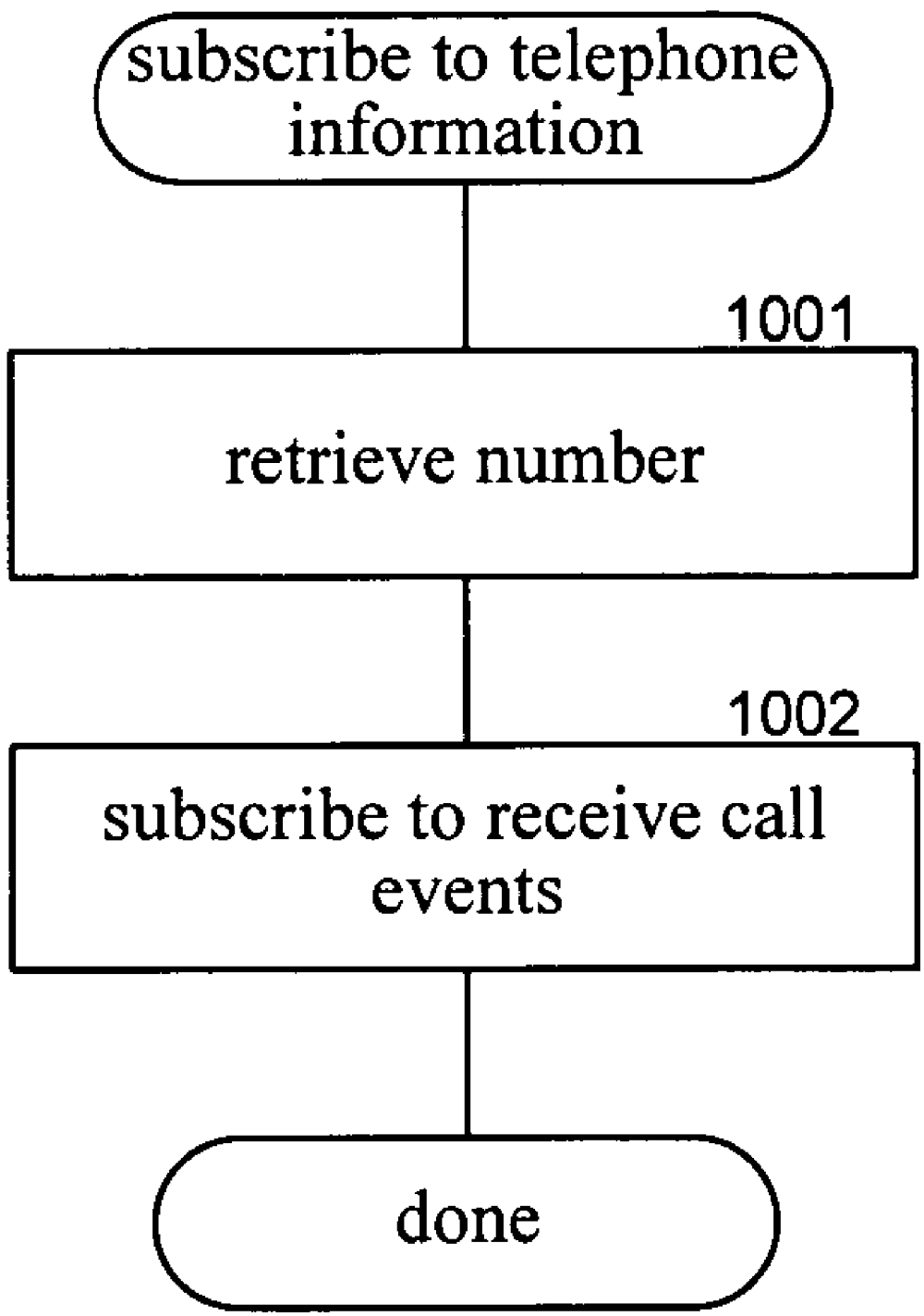
FIG. 10 is a flow diagram that illustrates the processing of a subscribe to telephone information component in one embodiment.

FIG. 10 is a flow diagram that illustrates the processing of a subscribe to telephone information component in one embodiment. In block 1001, the component retrieves the telephone number associated with the client computer system. In block 1002, the component sends a subscribe message to the telephone system to subscribe to all call related events directed to the retrieved telephone number. The component then completes.

Figure 11:
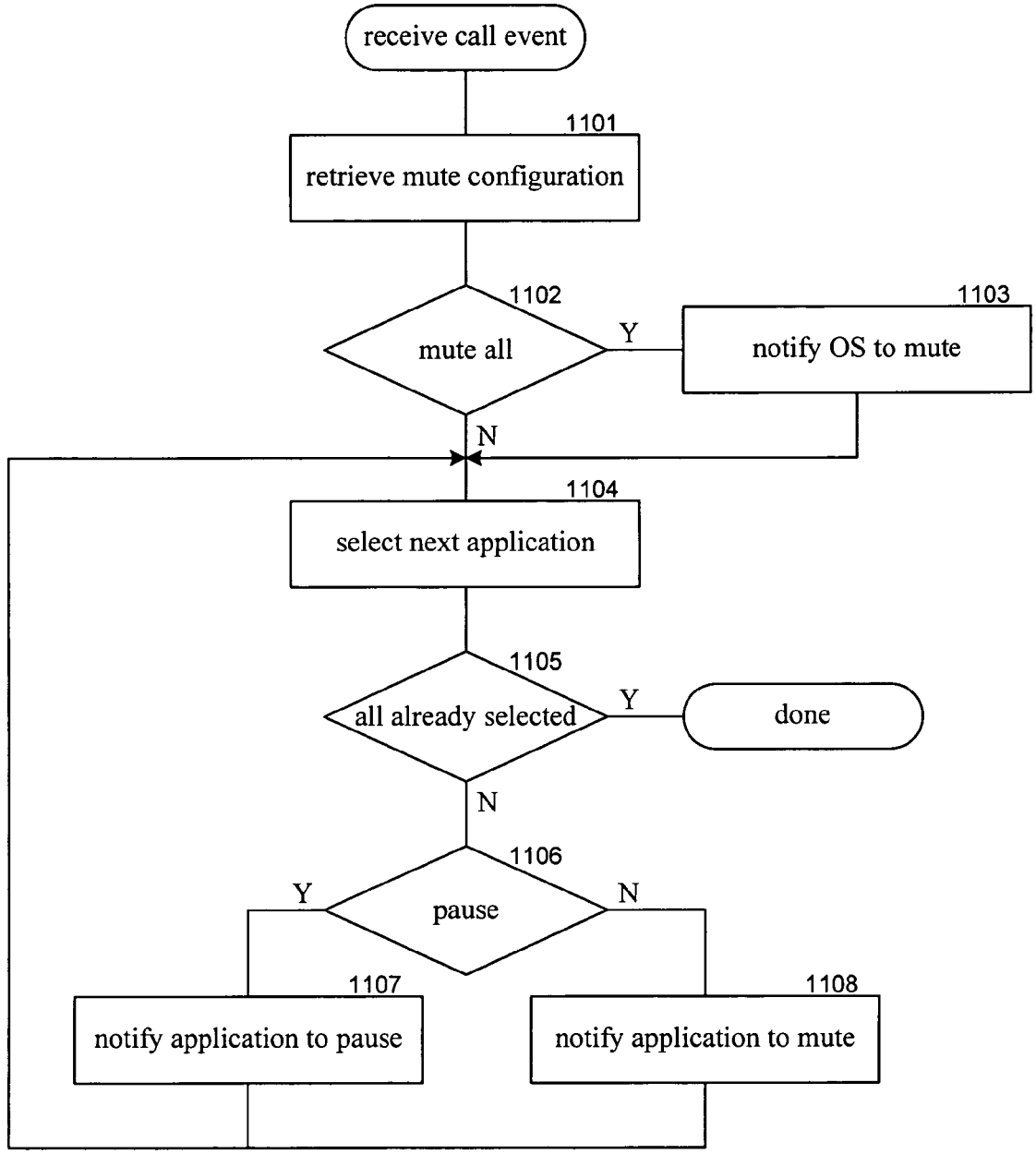
FIG. 11 is a flow diagram that illustrates the processing of the receive call event component of the muting system in one embodiment.

FIG. 11 is a flow diagram that illustrates the processing of the receive call event component of the muting system in one embodiment. The component retrieves the configuration information for the muting system and configures the applications accordingly. In block 1101, the component retrieves the configuration information for the muting system. In decision block 1102, if the configuration information indicates to mute all audio, then the component continues at block 1103, else the component continues at block 1104. In block 1103, the component notifies the operating system to mute all audio. In blocks 1104-1108, the component loops selecting each application specified in the configuration information and taking the specified action. In block 1104, the component selects the next application of the configuration information. In decision block 1105, if all the applications have already been selected, then the component completes, else the component continues at block 1106. In decision block 1106, if the action associated with the selected application is to pause, then the component continues at block 1107, else the component continues at block 1108. In block 1107, the component notifies the selected application to pause and then loops to block 1104 to select the next application. In block 1108, the component notifies the selected application to mute and then loops to block 1104 to select the next application.

Figure 12:
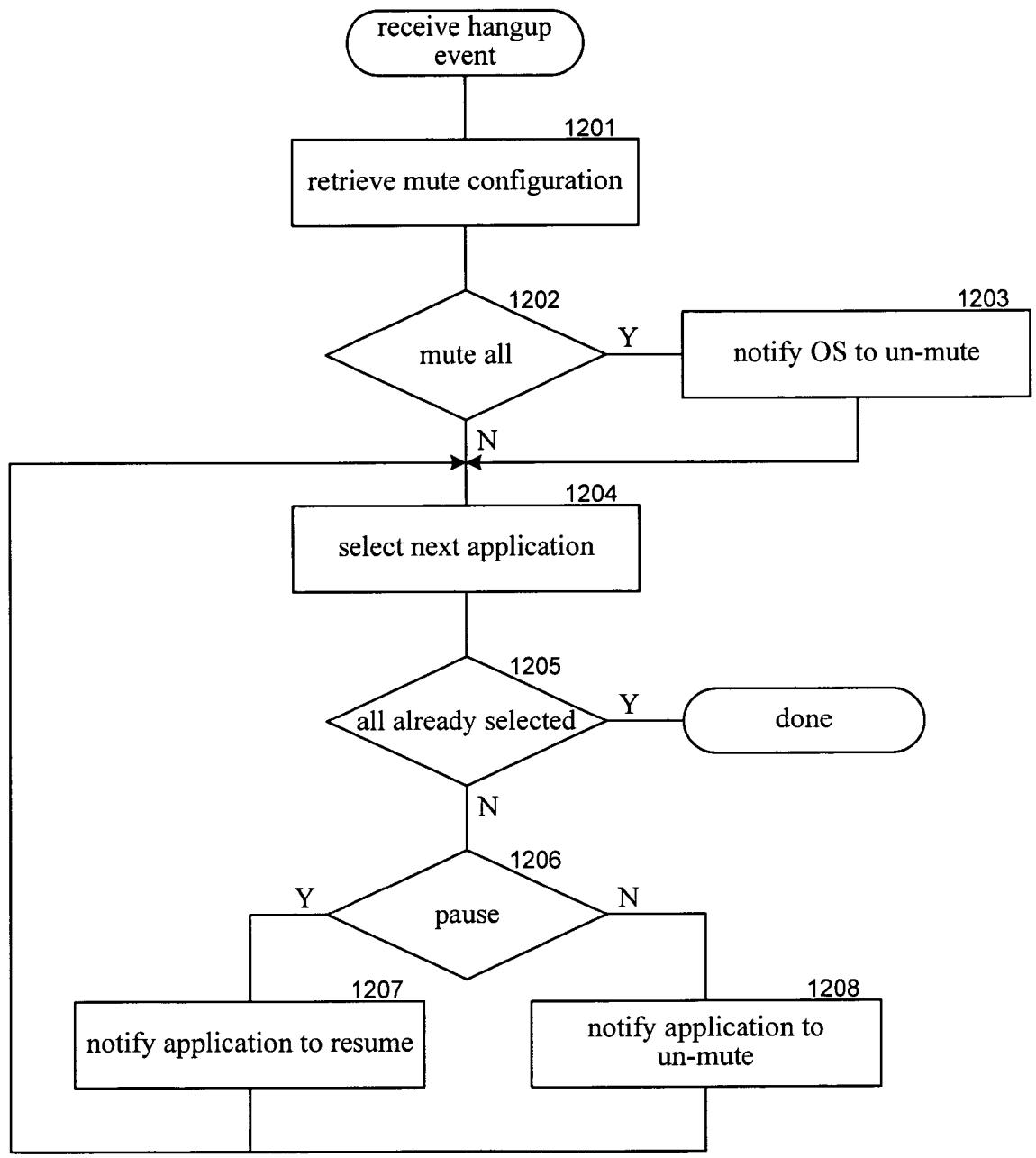
FIG. 12 is a flow diagram that illustrates the processing of the receive hang up event component of the muting system in one embodiment.

FIG. 12 is a flow diagram that illustrates the processing of the receive hang up event component of the muting system in one embodiment. The component retrieves the configuration information for the muting system and undoes the action performed when the corresponding incoming call event was received. In block 1201, the component retrieves the configuration information for the muting system. In decision block 1202, if the configuration information indicates to mute all audio, then the component continues at block 1203, else the component continues at block 1204. In block 1203, the component notifies the operating system to un-mute all audio. In blocks 1204-1208, the component loops selecting each application specified in the configuration information and undoing the specified action. In block 1204, the component selects the next application of the configuration information. In decision block 1205, if all the applications have already been selected, then the component completes, else the component continues at block 1206. In decision block 1206, if the action associated with the selected application is to pause, then the component continues at block 1207, else the component continues at block 1208. In block 1207, the component notifies the selected application to resume and then loops to block 1204 to select the next application. In block 1208, the component notifies the selected application to un-mute and then loops to block 1204 to select the next application.

From the foregoing, it will be appreciated that specific embodiments of the call forwarding system have been described herein for purposes of illustration, but that various modifications may be made without deviating from the spirit and scope of the invention. One skilled in the art will appreciate that a "telephone call," as used in this description, encompasses various types of voice conversations (e.g., voice over IP and voice over traditional telephone systems). One skilled in the art will appreciate that a computer system may have multiple telephone numbers associated with it. For example, a computer system may have a telephone number for a voice over IP and for a traditional telephone. In such a case, the call forwarding system may decide to forward the call to one of the telephone numbers based on presence information. For example, if the presence information indicates that the user is hosting a conference call with several people in the same room, then the call forwarding system may forward the call to the voice over IP telephone number to take advantage of the computer's sound system. In one embodiment, the muting system may optionally lower the volume of audio a specified level, rather than muting the audio. In that case, the muting system may record the volume level before it is lowered and restore the volume to that level after the call has completed. In one embodiment, the muting system may gradually decrease the volume when muting and gradually increase the volume when unmuting. The gradual change in volume (e.g., over 1-2 seconds) may be especially important when unmuting to prevent a sudden start to loud music. The muting system may also allow a user to select whether to automatically unmute when a call is completed. Accordingly, the invention is not limited except as by the appended claims.

We claim:

1. A method performed in a plurality of client computer systems of the user for forwarding a telephone call for the user to a telephone number associated with the user, the method comprising:

for each of the plurality of client computer systems of the user,
providing an association of the telephone numbers associated with the user to client computer systems of the user including this client computer system and the other client computer systems of the user;
subscribing to receive presence information for the other client computer systems of the user;
subscribing to receive call events for the telephone numbers associated with this client computer system and the other client computer systems of the user;
publishing presence information of this client computer system so that the other client computer systems can subscribe to and receive the presence information of this client computer system;
receiving presence information for the other client computer systems;
receiving an incoming call event for a telephone number of a client computer system of the user, wherein each client computer system of the user receives each incoming call event; and
when the incoming call event is received,
determining, based on the received presence information, a telephone number of which client computer system the call should be forwarded, wherein each client computer system determines the same telephone number;
when it is determined that the call should be forwarded to a telephone number of this client computer system, sending a notification to forward the call to a telephone number associated with this client computer system; and
when it is determined that the call should be forwarded to a telephone number associated with another client computer system, not sending a notification to forward the call
so that a calling person can place a call to any of the telephone numbers associated with the user and have the telephone call automatically forwarded to the telephone number associated with the client computer system that sent the notification.

2. The method of claim 1 wherein the determining determines that the call should be forwarded to the most active client computer system.

3. The method of claim 1 wherein the determining determines that the call should be forwarded to the client computer system with the most recent activity.

4. The method of claim 3 wherein the most recent activity does not include activity resulting from a remote access to a client computer system.

5. The method of claim 1 including when the determining determines that none of the client computer systems has recent activity, sending a notification to forward the call to a default telephone number.

6. The method of claim 5 wherein when the determining determines that none of the client computer systems has recent activity and this client computer system is a distinguished client computer system, sending an electronic mail message to a user indicating that the call has been forwarded to the default telephone number.

7. The method of claim 1 including when it is determined that the call should be forwarded to the telephone number of this client computer system, sending an electronic mail message to a user indicating that the call has been forwarded.

8. The method of claim 1 wherein when an incoming call is not answered and this client computer system is a distinguished client computer system, sending an electronic mail message to a user indicating that the call has been missed.

9. The method of claim 8 wherein the incoming call is forwarded, but not answered.

10. A computer-readable storage medium containing instructions for controlling a computer system to forward a telephone call for a user, the telephone call being for one of a plurality of telephone numbers associated with the user, by a method comprising:

receiving an indication of which telephone numbers of the user are associated with which computer systems of the user, the computer systems including this computer system and other computer systems;
subscribing to receive presence information of the other computer system of the user;
receiving presence information of the other computer systems;
receiving an indication that a call has been received for one of the plurality of telephone numbers;
determining at which of the computer systems the user is at based on the received presence information; and
when it is determined that the user is at this computer system, indicating that the call is to be forwarded to a telephone number associated with this computer system
wherein each computer system of the user receives the indication that a call has been received and each other computer system determines that the user is at this computer system.

11. The computer-readable storage medium of claim 10 wherein the determining is based on most recent user activity with a computer system.

12. The computer-readable storage medium of claim 11 wherein the most recent user activity does not include activity resulting from a remote access to a computer system.

13. The computer-readable storage medium of claim 10 including when the determining determines that the user is not at any of the computer systems, sending a notification to forward the call to a default telephone number.

14. The computer-readable storage medium of claim 10 wherein when the call is not answered and this computer system is a distinguished computer system, sending an electronic mail message to the user indicating that the call has been missed.

15. A method performed by each of a plurality of computer systems of a user for forwarding a telephone call to a telephone number associated with the user to a telephone number associated with the computer system at which the user is most likely present, the method comprising:

provic an association of the telephone numbers associated with the user to computer systems of the user;

subscribing to receive presence information for the other computer systems of the user;

subscribing to receive call events for the telephone numbers associated with the user;

publishing presence information of this client computer system so that the other computer systems can subscribe to and receive the presence information of this computer system;

receiving presence information for the other computer systems; and when an incoming call event is received for a telephone number associated with the user and it is determined, based on the received presence information and presence information of this computer system, that the user is most likely at this computer system, sending a notification to forward the call to a telephone number associated with this computer system, wherein only one of the plurality of computer systems send a notification for each incoming call event;

so that a call can be placed to any of the telephone numbers associated with the user and have the telephone call automatically forwarded to the telephone number at which the user is most likely present.

16. The method of claim 15 including when it is determined that the user is most likely present at this computer system, sending an electronic mail message to the user indicating that the call has been forwarded.

17. The method of claim 15 wherein when an incoming call is not answered and this computer system is a distinguished client computer system, sending an electronic mail message to the user indicating that the call has been missed.

18. The method of claim 17 wherein the incoming call is forwarded, but not answered.

* * * * *

UNITED STATES PATENT AND TRADEMARK OFFICE
CERTIFICATE OF CORRECTION

PATENT NO.       : 7,616,750 B2                                            Page 1 of 1
APPLICATION NO.  : 11/067611
DATED            : November 10, 2009
INVENTOR(S)      : Cadiz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1184 days.

Signed and Sealed this

Nineteenth Day of October, 2010

David J. Kappos
*Director of the United States Patent and Trademark Office*